(12) United States Patent
Dotzler et al.

(10) Patent No.: US 10,073,451 B2
(45) Date of Patent: Sep. 11, 2018

(54) SAFETY VERIFYING SYSTEM AND METHOD FOR VERIFYING TRACTOR-TRAILER COMBINATION

(71) Applicants: DENSO International America, Inc., Southfield, MI (US); DENSO CORPORATION, Kariya, Aichi-pref. (JP)

(72) Inventors: Kevin J. Dotzler, Poway, CA (US); Jason Graves, Oceanside, CA (US); Bryan Wells, Oceanside, CA (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 115 days.

(21) Appl. No.: 15/226,351

(22) Filed: Aug. 2, 2016

(65) Prior Publication Data

US 2018/0039266 A1 Feb. 8, 2018

(51) Int. Cl.
| | |
|---|---|
| *G05D 1/00* | (2006.01) |
| *G05D 1/02* | (2006.01) |
| *B60D 1/36* | (2006.01) |
| *B60D 1/26* | (2006.01) |
| *B60D 1/24* | (2006.01) |
| *G01C 21/34* | (2006.01) |

(52) U.S. Cl.
CPC ............ *G05D 1/0055* (2013.01); *B60D 1/248* (2013.01); *B60D 1/26* (2013.01); *B60D 1/36* (2013.01); *G01C 21/3415* (2013.01); *G05D 1/0022* (2013.01); *G05D 1/0027* (2013.01); *G05D 1/028* (2013.01); *G05D 1/0246* (2013.01); *G05D 1/0287* (2013.01); *G05D 2201/0213* (2013.01)

(58) Field of Classification Search
CPC .. G05D 1/0055; G05D 1/0287; G05D 1/0022; G05D 1/0246; G05D 1/028; G05D 1/0027; G05D 2201/0213; B60D 1/248; B60D 1/26; B60D 1/36; G01C 21/3415
See application file for complete search history.

(56) References Cited

U.S. PATENT DOCUMENTS

| | | | | |
|---|---|---|---|---|
| 3,689,695 | A * | 9/1972 | Rosenfield | ................ B60R 1/00 348/148 |
| 6,687,609 | B2 * | 2/2004 | Hsiao | ..................... G01C 21/26 340/993 |
| 6,690,413 | B1 * | 2/2004 | Moore | ..................... B60R 1/00 348/148 |
| 7,148,800 | B2 | 12/2006 | Cunningham et al. | |

(Continued)

*Primary Examiner* — Frederick M Brushaber

(57) ABSTRACT

The present disclosure provides a safety verifying system for a tractor-trailer combination. The system includes a trailer-data storing portion, a wireless reader, a determining portion, and a controlling portion. The trailer-data storing portion is disposed in a trailer that is to be towed by a tractor. The trailer-data storing portion stores first data associated with the trailer. The wireless reader retrieves the first data from the trailer-data storing portion. The determining portion determines whether the combination of the trailer and the tractor satisfies a safety requirement based on the first data retrieved by the wireless reader and second data associated with the tractor or an intended route to a destination of the trailer. The controlling portion controls operation of the tractor based on a result of the determining portion.

14 Claims, 4 Drawing Sheets

(56) References Cited

U.S. PATENT DOCUMENTS

| | | | | |
|---|---|---|---|---|
| 7,307,514 | B2* | 12/2007 | McAden | B60R 25/00 |
| | | | | 180/167 |
| 8,957,770 | B2* | 2/2015 | Hu | B60D 1/62 |
| | | | | 340/425.5 |
| 9,860,445 | B2* | 1/2018 | Kuehnle | H04N 5/23238 |
| 9,908,558 | B2* | 3/2018 | Popken | B62D 15/0285 |
| 2002/0113873 | A1* | 8/2002 | Williams | B60R 1/00 |
| | | | | 348/118 |
| 2007/0008107 | A1 | 1/2007 | Farrell et al. | |
| 2015/0066296 | A1* | 3/2015 | Trombley | B62D 13/06 |
| | | | | 701/41 |
| 2015/0120141 | A1* | 4/2015 | Lavoie | B62D 15/027 |
| | | | | 701/41 |
| 2016/0049020 | A1* | 2/2016 | Kuehnle | G07C 5/0808 |
| | | | | 701/34.4 |
| 2016/0366336 | A1* | 12/2016 | Kuehnle | H04N 5/23238 |

* cited by examiner

SAFETY VERIFYING SYSTEM AND METHOD FOR VERIFYING TRACTOR-TRAILER COMBINATION

FIELD

The present disclosure relates to a safety verifying system and a method for verifying a tractor-trailer combination.

BACKGROUND

This section provides background information related to the present disclosure which is not necessarily prior art.

The trucking industry has utilized a plurality of tractors and trailers in combinations according to transporting plans. There are variety of types of trailers in their sizes and usages, and even each trailer changes its weight, its destination, and so on depending on loads in the trailer.

Although, the combination of a trailer and a tractor needs to be inspected (i.e., verified) for safety reasons before starting operation, such a verification has been manually conducted by, e.g., a driver, a managing person of a trucking company, or the like, which may lead to miss-matching of the tractor-trailer combination such as excess of towing capacity.

SUMMARY

This section provides a general summary of the disclosure, and is not a comprehensive disclosure of its full scope or all of its features.

The present disclosure provides a safety verifying system for a tractor-trailer combination. The system includes a trailer-data storing portion, a wireless reader, a determining portion, and a controlling portion. The trailer-data storing portion is disposed in a trailer that is to be towed by a tractor. The trailer-data storing portion stores first data associated with the trailer. The wireless reader retrieves the first data from the trailer-data storing portion. The determining portion determines whether the combination of the trailer and the tractor satisfies a safety requirement based on the first data retrieved by the wireless reader and second data associated with the tractor or an intended route to a destination of the trailer. The controlling portion controls operation of the tractor based on a result of the determining portion.

The present disclosure further provides a method for verifying a tractor-trailer combination. The method including retrieving first data associated with a trailer that is to be towed by a tractor through wireless communication, determining whether the combination of the trailer and the tractor satisfies a safety requirement based on the first data and second data associated with the tractor or an intended route to a destination of the trailer, and controlling operation of the tractor based on a result of the determination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
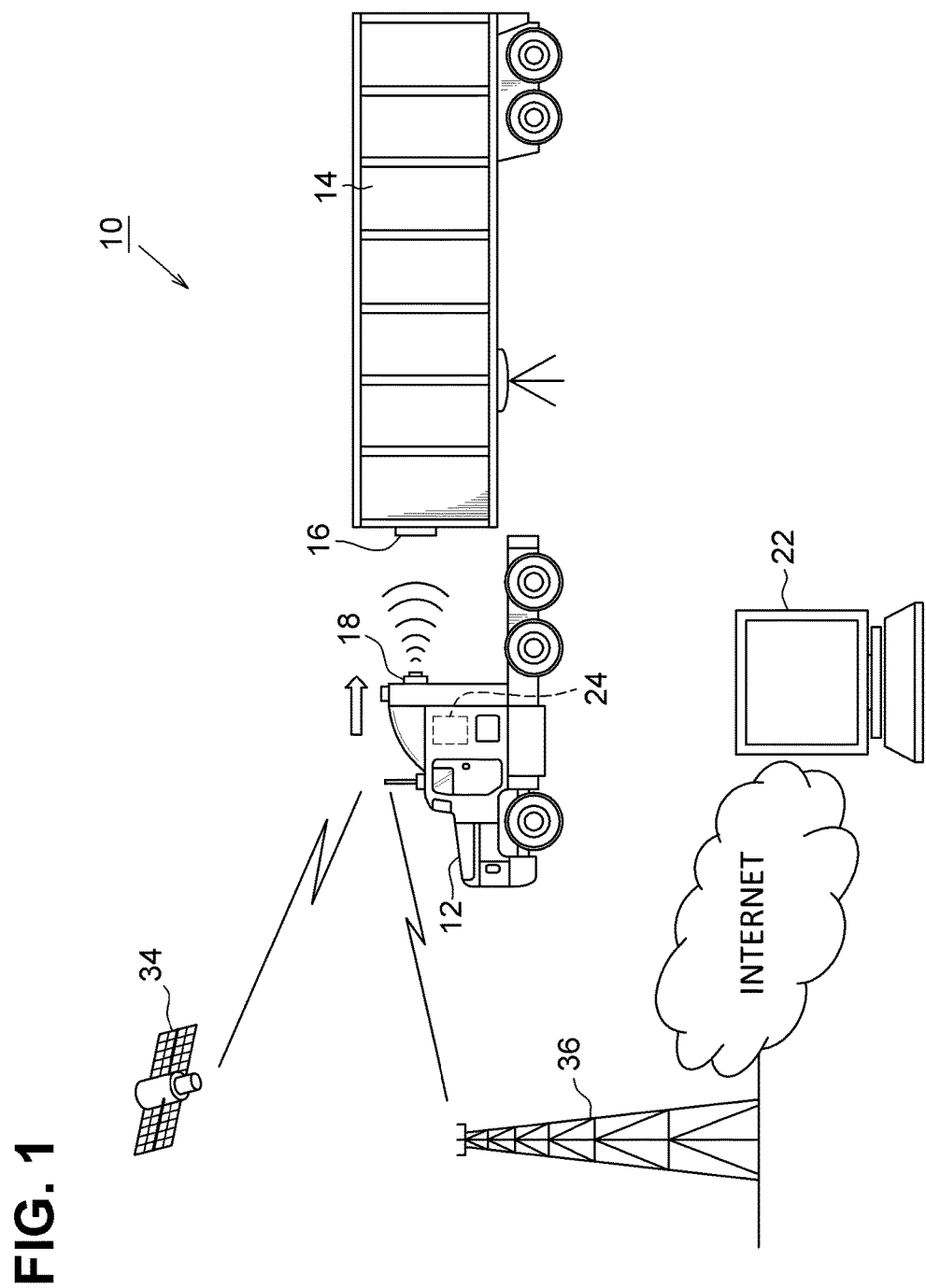
FIG. 1 is a high level system diagram of a safety verifying system according to a first embodiment.

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts may be combined. The embodiments may be partially combined even if it is not explicitly described that the embodiments may be combined, provided there is no harm in the combination.

FIG. 1 depicts a high level system diagram of a safety verifying system 10 and a method for verifying a tractor-trailer combination according to the present embodiment. FIG. 1 shows a tractor 12 that is reaching a trailer 14, as an intended towing target. The trailer 14 has loads (not shown) loaded therein. The safety verifying system 10 verifies the combination of the tractor 12 and the trailer 14 in terms of safety requirements before the tractor 12 starts towing the trailer 14.

The safety verifying system 10 generally includes a two-dimensional (2D) barcode 16 as a trailer-data storing portion, a camera 18 as a wireless reader, and a microprocessor 20 (see FIG. 2) as a determining portion and a controlling portion. In the present embodiment, the safety verifying system 10 further includes a trailer database 22 that is included in a central operating section (not illustrated) of a tracking company. The central operating section is located away from the trailer 14 and the tractor 12.

The trailer 14 has a rectangular parallelepiped shape. The two-dimensional barcode 16 such as a QR code (a registered trademark) is attached to a front surface (front side) of the trailer 14 such that the two-dimensional barcode 16 can be scanned on the front surface. The two-dimensional barcode 16 stores (i.e., encodes) first data associated with the trailer 14 and the loads in the trailer 14. The first data includes, for example, an ID number of the trailer 14, information of the loads, gross weight of the trailer 14 including the loads, a dimension of the trailer 14 (i.e., width, length, and height of the trailer 14), a destination of the trailer 14, a VIN (Vehicle Identification Number), a manufacturer of the trailer 14, a model of the trailer 14, an owner serialization, and other unique identifying information as to the trailer 14 or the loads.

The camera 18 is a vehicle mounted camera and is disposed in a rear side of the tractor 12 to face backward. The camera 18 serves as a barcode reader for a two-dimensional barcode 16 and automatically scans the two-dimensional barcode 16 when the two-dimensional barcode 16 comes into a specified readable range of the camera 18. The camera 18 is connected to a verifying unit 24 in the tractor 12, more specifically connected to the microprocessor 20 in the verifying unit 24, through Ethernet, for example. The camera 18 transmits the first data retrieved from the two-dimensional barcode 16 to the microprocessor 20 though the Ethernet.

Figure 2:
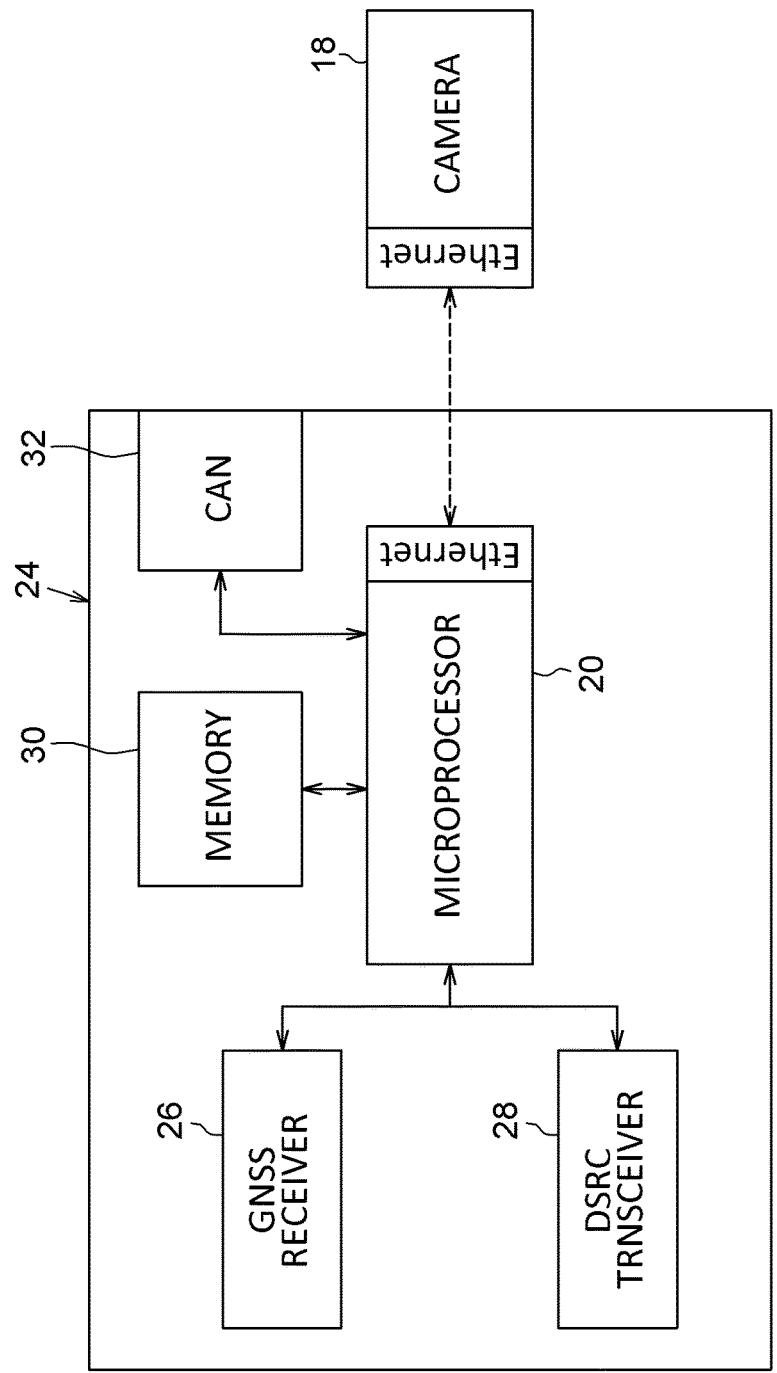
FIG. 2 is a block diagram of a verifying unit.

The verifying unit 24 is configured to form a V2X (Vehicle-to-everything) subsystem for the safety verifying system 10. As shown in FIG. 2, the verifying unit 24 includes the microprocessor 20, a GNSS (Global Navigation Satellite System) receiver 26, a DSRC (Dedicated Short-Range Communications) transceiver 28, a memory 30, and a CAN (Controller Area Network) bus 32. The microprocessor 20 is connected to all other components 26, 28, 30, 32 in the verifying unit 24.

The GNNS receiver 26 is configured to receive wireless signals from a satellite 34 (see FIG. 1). The wireless signals are used to locate the tractor 12 and the trailer 14. The DSRC transceiver 28 is configured to wirelessly communicate with the trailer database 22 and other surrounding vehicles through a DSRC network such as DSRC RSEs (Road Side Equipment) 36 (see FIG. 1).

The trailer database 22 stores data for all trailers 14 managed by the trucking company. The data stored in the trailer database 22 includes identification data as the third data as to the respective trailer 14. The third data includes the same information as the first data, i.e., an ID number of a trailer 14, gross weight of the trailer 14 including a load loaded on the trailer 14, information of loads loaded on the trailer 14, a dimension of the trailer 14 (i.e., width, length, and height of the trailer 14), a destination of the trailer 14, a VIN (Vehicle Identification Number), a manufacturer of the trailer 14, a model of the trailer 14, an owner serialization, and other unique identifying information on the trailer 14. In addition, the third data may further include DMV (Department of Motor Vehicles) registration information, inspection records, recommended tire pressures for the trailer 14, or the like. As shown in FIG. 1, the trailer database 22 is linked to the DSRC RSEs 36 through the internet.

The memory 30 is a form of computer data storage and includes a ROM and a RAM. The memory 30 stores programs executed by the microprocessor 20. The memory 30 further stores second data associated with the tractor 12 or an intended route to the destination of the trailer 14. The destination is set by, e.g., a driver, a yard worker, or a managing person of a trucking company. The second data includes, for example, a towing capacity of the tractor 12, overpass height data along the intended route that is retrieved from map data, applicable laws in scheduled passing regions along the intended route, or the like.

The CAN bus 32 is connected to both an electronic control unit (ECU, not illustrated) for controlling an engine of the tractor 12 and the microprocessor 20. The ECU and the microprocessor 20 are allowed to communicate with each other through the CAN bus 32. The ECU sends operating condition of the engine to the microprocessor 20, whereas the microprocessor 20 sends controlling signals to the ECU. That is, the microprocessor 20 controls operation of the tractor 12 through the ECU, as will be described below.

The microprocessor 20 performs functions by executing the programs stored in the memory 30. As one of functions, the microprocessor 20 determines whether the combination of the trailer 14 and the tractor 12 satisfies a safety requirement based on the first data and the second data. In the present embodiment, the microprocessor 20 further determines whether the combination of the trailer 14 and the tractor 12 satisfies an identity requirement based on the first data and the third data. In other words, the microprocessor 20 makes a decision concerning "validity" of the combination of the trailer 14 and the tractor 12 in terms of safety and identity reasons. The microprocessor 20 inputs the first data retrieved by the camera 18 through the Ethernet. The second data is input to the microprocessor 20 from the memory 30. Further, the microprocessor 20 inputs the third data from the trailer database 22 through the DSRC transceiver 28. Then, the microprocessor 20 generates controlling signals based on a determination result and sends the controlling signals to the ECU through the CAN bus 32.

The microprocessor 20 generates a controlling signal to allow movement of the tractor 12 with the trailer 14 when the microprocessor 20 determines that the combination of the trailer 14 and the tractor 12 satisfies the safety requirement. In contrast, the microprocessor 20 generates a controlling signal to prohibit movement of the tractor 12 with the trailer 14 when the microprocessor 20 determines that the combination of the trailer 14 and the tractor 12 does not satisfy the safety requirement. Alternatively, the microprocessor 20 may generate a controlling signal to restrict or change operation of the tractor 12 when the microprocessor 20 determines that the combination of the trailer 14 and the tractor 12 does not satisfy the safety requirement.

In the present embodiment, the safety requirement includes, for example, a towing capacity test and an overpass height test. The identity requirement includes a trailer identity test. In the present embodiment, the processor 20 is programmed to perform the trailer identity test first, and then performs the towing capacity test and the overpass height test. In the trailer identity test, the microprocessor 20 compares the first data of the trailer 14 input from the camera 18 to the third data obtained from the DSRC transceiver 28 to identify the trailer 14 as an actually intended trailer. More specifically, the microprocessor 20 compares information identifying the trailer 14 in the first data, such as the ID number, the owner serialization, the destination or the like, to corresponding information in the third data. When the information in the first data does not match the information in the third data, which means the trailer 14 is not the actually intended trailer, the microprocessor 20 determines that the trailer identity test is not satisfied and then generates and sends a controlling signal to prohibit movement of the tractor 12 with the trailer 14 to the ECU. On the other hand, when the information in the first data matches the information in the third data, the trailer 14 is verified as the actual intended trailer and the microprocessor 20 determines that the trailer identity test is satisfied. In the present embodiment, the microprocessor 20 proceeds to the towing capacity test and the overpass height test without allowing movement of the tractor 12 with the trailer 14.

In the towing capacity test, the microprocessor 20 compares the towing capacity of the trailer 14 stored in the memory 30 to the gross weight of the trailer 14 input from the camera 18. When the gross weight of the trailer 14 is equal to or less than the towing capacity, the microprocessor 20 determines that the combination of the trailer 14 and the tractor 12 satisfies the towing capacity test (i.e., verified), and then the microprocessor 20 generates and sends a controlling signal to allow movement of the tractor 12 with the trailer 14 to the ECU (i.e., the tractor 12 is allowed to start travel). On the other hands, when the gross weight of the trailer 14 is greater than the towing capacity of the tractor 12, the microprocessor 20 determines that the combination of the trailer 14 and the tractor 12 does not satisfy the towing capacity test (i.e., not verified), and then the microprocessor 20 generates and sends a controlling signal to prohibit movement of the tractor 12 with the trailer 14 to the ECU (i.e., the tractor 12 is prohibited from starting travel).

In the overpass height test, the microprocessor 20 compares the height of the trailer 14 input from the camera 18 to the overpass height data for the intended route stored in the memory 30. When the height of the trailer 14 is substantially less than the overpass height data, the microprocessor 20 determines that the combination of the trailer 14 and the tractor 12 satisfies the overpass height test. More specifically, when the lowest overpass height in the overpass height data for the intended route is greater than the height of the trailer 14 by a specified value (e.g., 20 inches), the microprocessor 20 determines that the overpass height test is satisfied. When the overpass height test is satisfied, the microprocessor 20 generates and sends a controlling signal to allow movement of the tractor 12 with the trailer 14 to the ECU.

In contrast, when the difference between the lowest overpass height in the overpass height data and the height of the trailer 14 is less than the specified value or the lowest overpass height is less than the height of the trailer 14, the microprocessor 20 determines that the overpass height test is not satisfied. In this case, the microprocessor 20 generates a controlling signal to prohibit movement of the tractor 12 with the trailer 14 to the ECU. Alternatively, in the overpass height test, the microprocessor 20 may provide an alternative route to the destination where the lowest height in the alternative route is greater than the height of the trailer 14 by the specified value.

Figure 3:
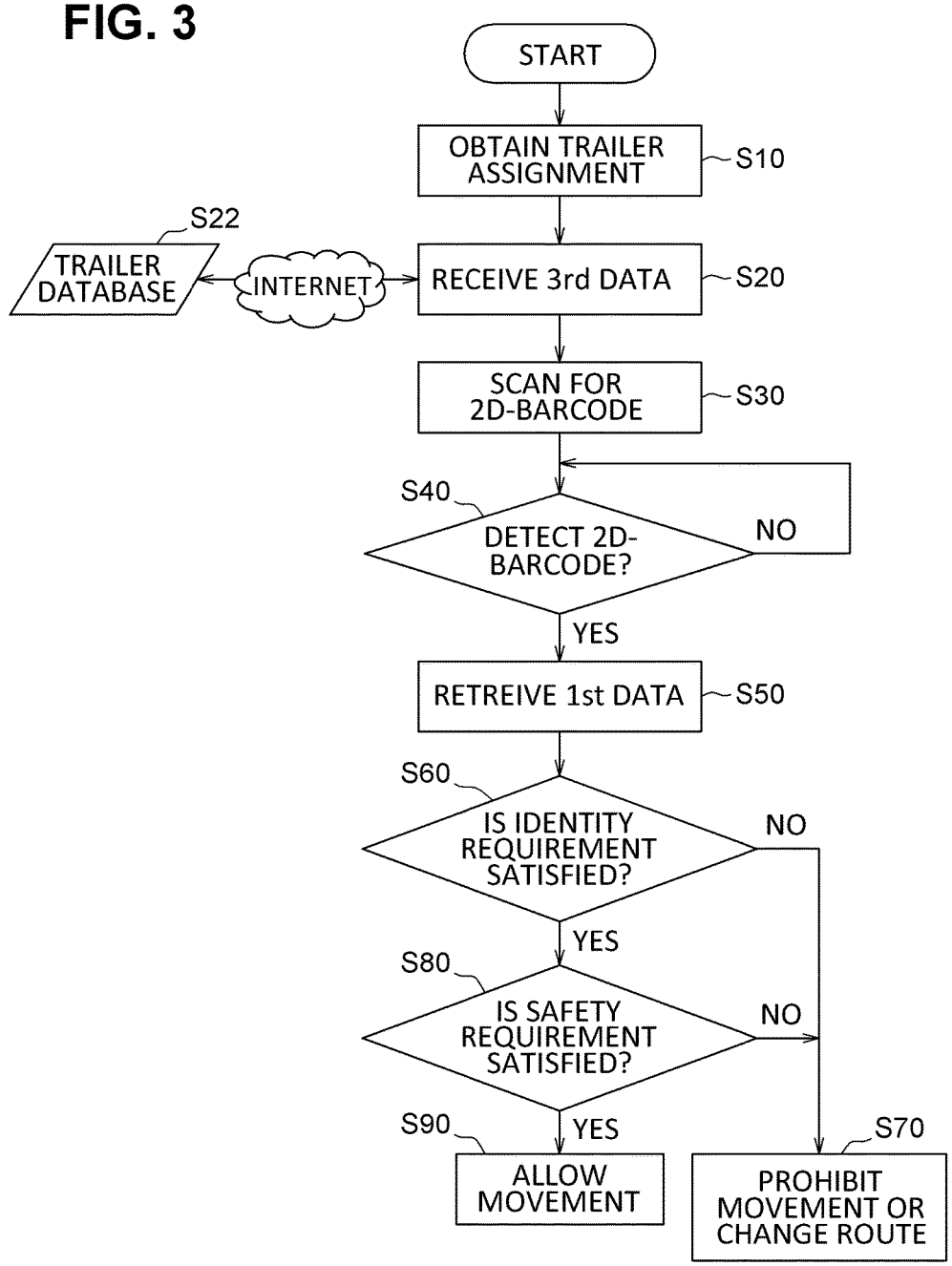
FIG. 3 is a flowchart of process for verifying a tractor-trailer combination.

Next, the process for verifying the combination of the trailer 14 and the tractor 12 will be described with reference to FIG. 3. It should be noted that the first data, the second data, and the third data are stored (or encoded) in advance in the two-dimensional barcode 16, the memory 30, and the trailer database 22, respectively. When a driver of a tractor 12 receives a trailer assignment for delivery from a trucking company (Step 10), the microprocessor 20 receives third data of an intended trailer 14 (i.e., an actually assigned trailer) through the DSRC transceiver 28, a DSRC RSE 36, and the internet from the trailer database 22 (Step 20).

Then, the camera 18 automatically starts scanning for the two-dimensional barcode 16 of a trailer 14 (Step 30). When the tractor 12 is reaching a trailer 14 and the two-dimensional barcode 16 attached to the trailer 14 comes into a readable range of the camera 18 (Step 40: YES), the camera 18 reads the two-dimensional barcode 16 of the trailer 14 and retrieves the first data in the barcode (Step 50).

After the camera 18 retrieves the first data from the two-dimensional barcode 16, the first data is transmitted to the microprocessor 20 through the Ethernet. Next, the microprocessor 20 compares the first data with the third data to determine whether the combination of the trailer 14 and the tractor 12 satisfies the identity requirement (i.e., the trailer identity test) at Step 60. When the first data does not match the third data (Step 60: NO), the trailer 14 is not the intended trailer 14, and therefore the microprocessor 20 prohibits movement of the tractor 12 with the trailer 14 at Step 70. Therefore, if the driver mistakenly tries to connect the tractor 12 to a wrong trailer 14, the tractor 12 can be prohibited from traveling with such a wrong trailer 14.

If the first data matches the third data (Step 60: YES), the trailer 14 is verified as the actually intended trailer 14 (the trailer identity test is satisfied) and the process proceeds to Step 80. At Step 80, the microprocessor 20 determines whether the combination of the trailer 14 and the tractor 12 satisfies the safety requirement based on the first data and the second data. In other words, the microprocessor 20 executes the towing capacity test and the overpass height test as to the current tractor-trailer combination. When the safety requirement is satisfied, the processor 20 allows movement of the tractor 12 with the trailer 14 at Step 90. On the contrary, if the safety requirement is not satisfied, the process proceeds to the Step 70, and the microprocessor 20 prohibits movement of the tractor 12 with the trailer 14. Alternatively, if only the overpass height test is not satisfied, the microprocessor 20 may provide an alternative route instead of prohibiting movement of the tractor 12.

In this way, even if the tractor 12 is connected to a correct trailer 14 as intended, movement of the tractor 12 with the trailer 14 can be still prohibited or operation of the tractor 12 with the trailer 14 can be changed unless the safety requirement is satisfied. Therefore, reliable safety verification as to the tractor-trailer combination can be provided according to the present embodiment. Furthermore, the retrieval of the first data from the two-dimensional barcode 16 is automatically performed by the camera 18. Thus, there is no concern about occurrence of human error during the retrieval of the first data.

Second Embodiment

Figure 4:
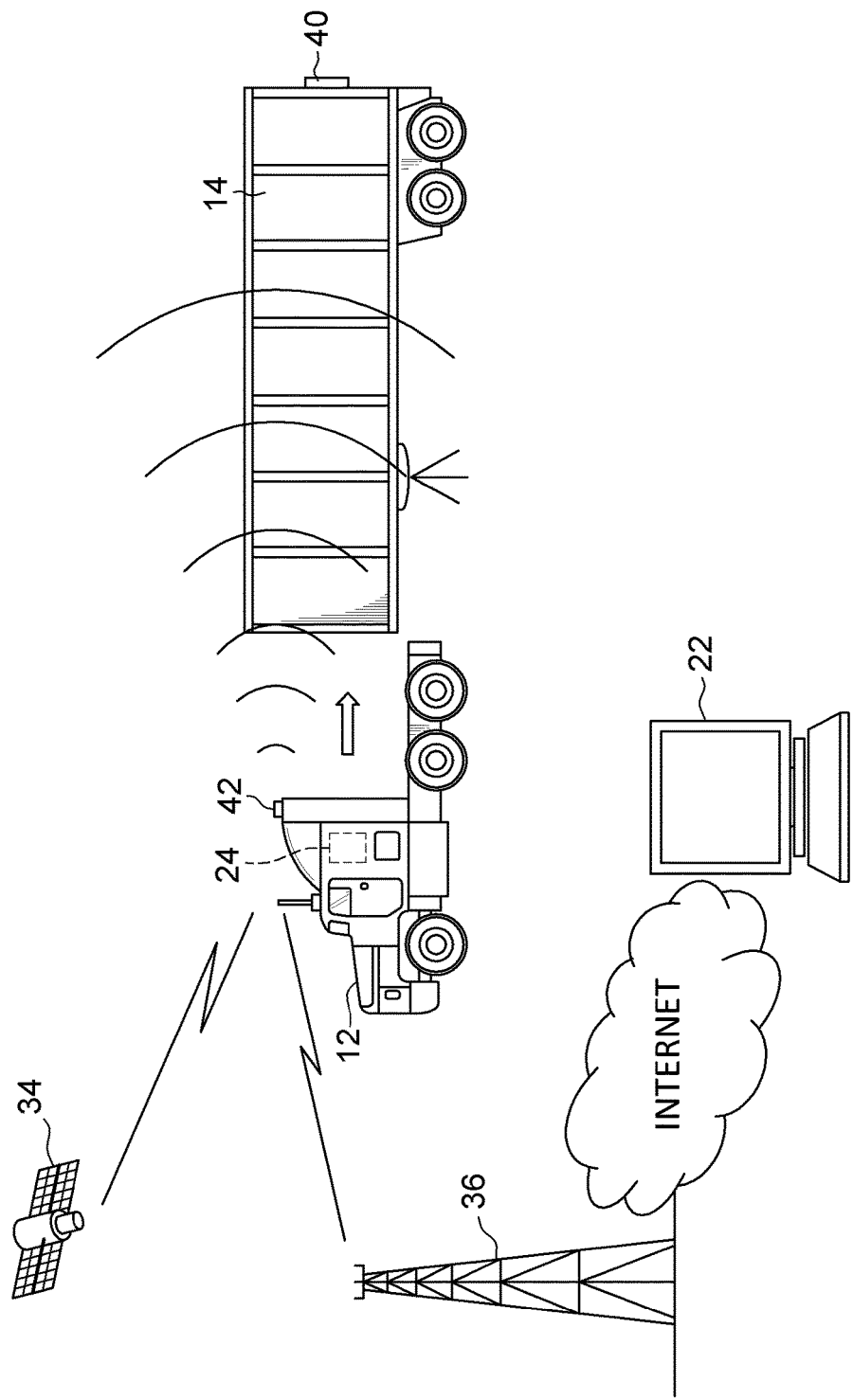
FIG. 4 is a high level system diagram of a safety verifying system according to a second embodiment.

In the first embodiment, the two-dimensional barcode 16 is attached to the trailer 14 and the first data in the two-dimensional barcode 16 is retrieved by the camera 18. Alternatively, the first data may be stored in an RFID (Radio-Frequency Identification) tag 40 and the first data in the RFID tag 40 may be read by an RFID reader 42. In this case, the RFID tag 40 can be attached to, for example, a rear side of the trailer 14 as shown in FIG. 4. Furthermore, the RFID reader 42 may be disposed in the tractor 12 at a top side of the tractor 12.

As with the first embodiment, the RFID reader 42 automatically scans the RFID tag 40 when the RFID tag 40 comes into a specified readable range of the RFID reader 42. Furthermore, the RFID reader 42 and the RFID tag 40 are not necessarily positioned such that the RFID reader 42 and the RFID tag 40 face each other when the tractor 12 is connected to the trailer 14. Thus, positional restriction on the RFID reader 42 and the RFID tag 40 can be relaxed as compared to the camera 18 and the two-dimensional barcode 16.

Other Embodiments

In the first embodiment, the microprocessor 20 determines (i) whether the combination of the tractor 12 and the trailer 14 satisfies the identity requirement by comparing the first data with the third data and then determines (ii) whether the combination of the tractor 12 and the trailer 14 satisfies the safety requirement by comparing the first data and the second data. However, the microprocessor 20 may perform only the determination of the safety requirement without considering the identity requirement.

In the first embodiment, the microprocessor 20 verifies the combination of the trailer 14 and the tractor 12 and controls operation of the tractor 12 based on the verification result. Alternatively, a central computer (not shown) included in the central operating section may be further added and the first data and the second data are transmitted by the microprocessor 20 to the central computer through the DSRC network. Furthermore, the third data is input to the central computer from the trailer database 22 and the central computer may verifies the combination of the tractor 12 and the trailer 14 as the microprocessor 20 does in the first embodiment. Then, the central computer may generate a control signal to control operation of the tractor 12 to the microprocessor 20 through the DSRC network.

In the first embodiment, the microprocessor 20 serves as the determining portion that determines whether the tractor-trailer combination satisfies the safety requirement and the controlling portion that controls operation of the tractor 12. However, the function of the determining portion and the function of the controlling portion may be performed by separate components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. A safety verifying system for a tractor-trailer combination, comprising:
    a trailer-data storing portion that is disposed in a trailer that is to be towed by a tractor, the trailer-data storing portion storing or encoding first data associated with the trailer;
    a wireless reader that retrieves the first data from the trailer-data storing portion;
    a determining portion that determines whether the combination of the trailer and the tractor satisfies a safety requirement based on the first data retrieved by the wireless reader and second data associated with the tractor or an intended route to a destination of the trailer; and
    a controlling portion that controls operation of the tractor based on a result of the determining portion, wherein
    the trailer-data storing portion is a two-dimensional barcode,
    the wireless reader is a camera,
    the two-dimensional barcode is disposed on a front side of the trailer,
    the camera is a vehicle mounted camera that is disposed in a rear side of the tractor, wherein
    the camera is configured to automatically scan the two-dimensional barcode when the tractor is reaching the trailer and the two-dimensional barcode comes into a readable range of the camera.

2. The safety verifying system according to claim 1, wherein
    the controlling portion allows movement of the tractor with the trailer when the determining portion determines that the combination of the trailer and the tractor satisfies the safety requirement.

3. The safety verifying system according to claim 1, wherein
    the controlling portion prevents movement of the tractor with the trailer when the determining portion determines that the combination of the trailer and the tractor does not satisfy the safety requirement.

4. The safety verifying system according to claim 1, wherein
    the first data includes gross weight of the trailer including weight of a load on the trailer,
    the second data includes a towing capacity of the tractor, and
    the determining portion determines that the combination of the trailer and the tractor does not satisfy the safety requirement when the gross weight of the trailer is greater than the towing capacity.

5. The safety verifying system according to claim 1, wherein
    the first data includes a height of the trailer,
    the second data includes overpass height data for the intended route, and
    the determining portion determines that the combination of the trailer and the tractor does not satisfy the safety requirement when the height of the trailer is greater than the overpass height data or a difference between the overpass height data and the height of the trailer is less than a specified value.

6. The safety verifying system according to claim 5, wherein
    the controlling portion provides an alternative route when the determining portion determines that the combination of the trailer and the tractor does not satisfy the safety requirement.

7. The safety verifying system according to claim 1, further comprising
    a trailer database that stores third data associated with the trailer, wherein
    the determining portion further determines whether the combination of the trailer and the tractor satisfies an identity requirement based on the first data and the third data, and
    the determining portion determines that the combination of the trailer and the tractor satisfies the identity requirement when the first data matches the third data.

8. A method for verifying a tractor-trailer combination, comprising:
    retrieving first data associated with a trailer that is to be towed by a tractor through wireless communication;

determining whether the combination of the trailer and the tractor satisfies a safety requirement based on the first data and second data associated with the tractor or an intended route to a destination of the trailer; and controlling operation of the tractor based on a result of the determination, wherein the method further includes automatically scanning, with a camera disposed on a rear side of the tractor, a two-dimensional barcode that is disposed on a front side of the trailer and encodes the first data, when the tractor is reaching the trailer and the two-dimensional barcode comes into a readable range of the camera.

9. The method according to claim 8, wherein
the controlling of operation of the tractor includes allowing movement of the tractor with the trailer when the combination of the trailer and the tractor satisfies the safety requirement.

10. The method according to claim 8, wherein
the controlling of operation of the tractor includes preventing movement of the tractor with the trailer when the combination of the trailer and the tractor does not satisfy the safety requirement.

11. The method according to claim 8, wherein
the first data includes gross weight of the trailer including weight of a load on the trailer,
the second data includes a towing capacity of the tractor, and
the combination of the trailer and the tractor is determined not to satisfy the safety requirement when the gross weight of the trailer is greater than the towing capacity.

12. The method according to claim 8, wherein
the first data includes height of the trailer,
the second data includes overpass height data for the intended route, and
the combination of the trailer and the tractor is determined not to satisfy the safety requirement when the height of the trailer is greater than the overpass height data or a difference between the overpass height data and the height of the trailer is less than a specified value.

13. The method according to claim 12, wherein
the controlling of operation of the tractor includes providing an alternative route when the combination of the trailer and the tractor is determined not to satisfy the safety requirement.

14. The method according to claim 8, further comprising
storing third data associated with the trailer, and
determining whether the combination of the trailer and the tractor satisfies an identity requirement based on the first data and the third data, wherein
the combination of the trailer and the tractor is determined to satisfy the identity requirement when the first data matches the third data.

* * * * *